A. H. BRANDON.
BATTERY BOX.
APPLICATION FILED JAN. 12, 1910.

984,068.

Patented Feb. 14, 1911.

WITNESSES:
D. C. Walter
Leona Kilratz

INVENTOR.
Arthur H. Brandon,
By Nixon Hall, Atty

UNITED STATES PATENT OFFICE.

ARTHUR H. BRANDON, OF TOLEDO, OHIO.

BATTERY-BOX.

984,068.

Specification of Letters Patent. Patented Feb. 14, 1911.

Application filed January 12, 1910. Serial No. 537,728.

*To all whom it may concern:*

Be it known that I, ARTHUR H. BRANDON, a citizen of the United States, residing at Toledo, in the county of Lucas and State of Ohio, have invented certain new and useful Improvements in Battery-Boxes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a holder for the cells of a battery such as is commonly used in automobile practice, and is designed to furnish a cheap, simple and efficient means for connecting the cells of such battery in series by the mere act of closing the lid of the box in which the cells are contained.

A further object of my invention is to so arrange the spring contact-pieces, hereinafter referred to, that undue movement of the cells is prevented and the terminals of the respective cells are invariably disposed in proper relation to each other.

I attain these objects by means of the devices, construction and arrangement of parts hereinafter described, and shown and illustrated in the accompanying drawings, in which,—

Figure 1:
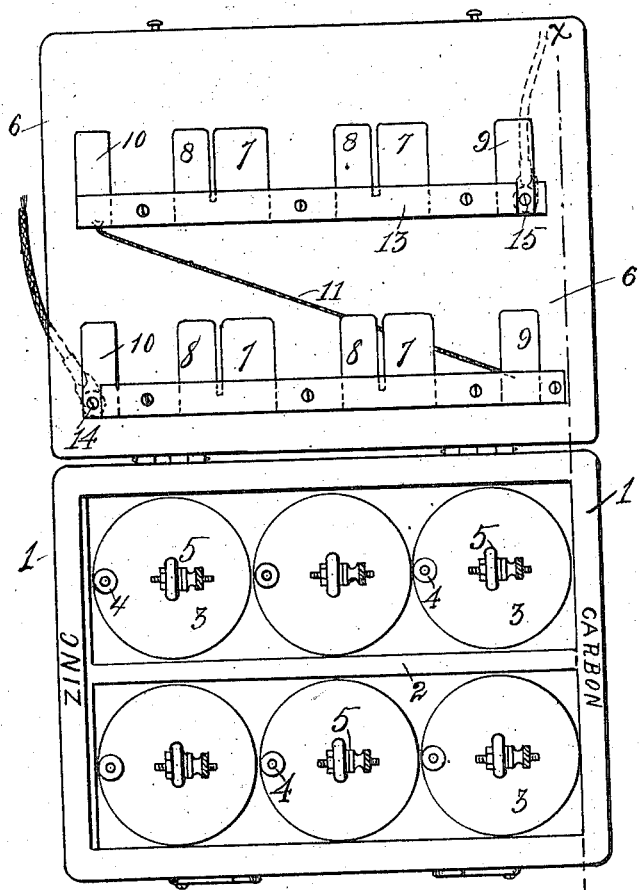
Figure 2:
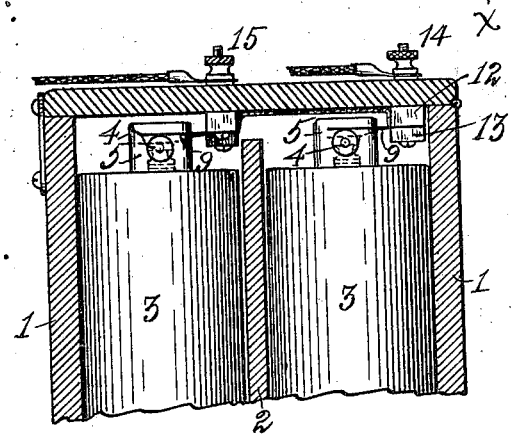

Figure 1 is a top-plan view of my holder with the lid thrown open and with the battery-cells in place, and Fig. 2 a sectional end-view of the same taken on line x—x Fig. 1, and with the lid closed.

Like numerals of reference indicate like parts in both figures.

In the drawings, 1 is a box—usually and preferably of wood—divided, in the present instance, into two compartments by the central partition 2. The box is of such height as to receive vertically the ordinary dry battery-cell or other required cell 3, and the compartments are of such horizontal dimensions as to receive, with a loose fit, the proper number of cells to constitute the requisite series. The cells are placed in their compartments in such fashion that the upwardly projecting zinc terminals 4 and carbon terminals 5 alternate and are in alinement.

Upon the underside of the hinged lid 6 is secured a series of sheet metal spring contact-pieces. Intermediate the ends of the series, the sheet metal pieces are each provided with two integral fingers 7—8. The end spring-pieces consist of single fingers 9—10. The arrangement is such that when the lid is closed one of the spring fingers 7—8 will contact with the binding-screw of the zinc terminal of one cell while the other finger will contact with the carbon terminal of the adjoining cell. At opposite ends of the lids, one of the single spring-fingers will contact with the first or inleading binding-screw in the series, the other single finger contacting with the last or outleading terminal in the series. In the device illustrated, the fingers 8 and 9 contact with the carbon terminals, and the fingers 7 and 10 contact with the zinc terminals of the respective cells. In the present instance, the series of cells being divided into two compartments, the last single finger of one compartment is connected by a wire or metal strip 11 with the first single finger in the other compartment. By this arrangement, all the like cell-terminals are turned in the same direction. To facilitate the placing of the cells with their pole-terminals in proper position, one end of the box is marked "Carbon", the other end "Zinc".

In order that the spring fingers may be short and light and at the same time have considerable stiffness and be brought nearer to the terminals with which they are to contact, there is secured to the underside of the lid a wood strip 12, and to the underside of this strip is secured another wood strip 13, and between these two strips is securely clamped one end of the metal strips 7—8—9—10, the other end of these strips being free and projecting far enough to firmly contact with their appropriate pole-pieces when the lid is closed.

The first single finger-piece in the series is connected with a binding-post 14, and the last single finger-piece in the series is connected with the opposite binding-post 15.

It will be understood that when the lid is closed all of the cells will, through the several spring fingers, be connected up in series and that the downward pressure of the spring finger-pieces will, in connection with the sides of the box, hold the cells against rattling.

Having described my invention, what I claim and desire to secure by Letters Patent is,—

In a device of the described character, a box having a compartment adapted for the reception of a series of battery-cells side by side, a lid for the box, and a series of sheet metal spring-fingers secured in alinement to the inner side of the lid, the end-pieces of said series consisting of single fingers, and the intermediate pieces of said series consisting of a pair of integral fingers, said several spring finger-pieces being adapted and arranged to press upon and engage the opposite terminals of battery-cells in series.

In testimony whereof I affix my signature in presence of two witnesses.

ARTHUR H. BRANDON.

Witnesses:
CLAYTON MURPHY,
LEONA KIBURTZ.